(12) United States Patent
Mueller et al.

(10) Patent No.: US 9,284,003 B2
(45) Date of Patent: Mar. 15, 2016

(54) BICYCLE SADDLE

(71) Applicant: RTI Sports Vertrieb von Sportartikeln GmbH, Koblenz (DE)

(72) Inventors: Michael Mueller, Siershahn (DE); Andreas Krause, Koblenz (DE)

(73) Assignee: RTI Sports Vertrieb Von Sportartikeln GmbH, Koblenz (DE)

( * ) Notice: Subject to any disclaimer, the term of this patent is extended or adjusted under 35 U.S.C. 154(b) by 82 days.

(21) Appl. No.: 13/767,315

(22) Filed: Feb. 14, 2013

(65) Prior Publication Data

US 2013/0214568 A1 Aug. 22, 2013

(30) Foreign Application Priority Data

Feb. 16, 2012 (DE) .................. 20 2012 001 583 U

(51) Int. Cl.
*B62J 1/00* (2006.01)
*B62J 1/08* (2006.01)

(52) U.S. Cl.
CPC .. *B62J 1/00* (2013.01); *B62J 1/007* (2013.01); *B62J 1/08* (2013.01)

(58) Field of Classification Search
USPC ............................................. 297/195.1, 197
See application file for complete search history.

(56) References Cited

U.S. PATENT DOCUMENTS

| | | | |
|---|---|---|---|
| 1,440,213 A | 12/1922 | Du Broy | |
| 4,098,537 A | 7/1978 | Jacobs | |
| 5,426,972 A | 6/1995 | Heirtzler et al. | |
| 5,610,336 A | 3/1997 | Svinkin | |
| 5,791,730 A | 8/1998 | Hoffacker | |
| 6,231,122 B1 | 5/2001 | Goldstein | |
| 6,254,180 B1 | 7/2001 | Nelson | |
| 6,957,857 B1 | 10/2005 | Lee | |
| 7,367,619 B2 * | 5/2008 | Fregonese et al. | 297/195.1 |
| 8,167,369 B2 * | 5/2012 | Tsai | 297/195.1 |
| 8,485,598 B2 * | 7/2013 | Hsu | 297/215.15 |
| 2006/0119147 A1* | 6/2006 | Nelson | 297/195.1 |
| 2007/0273184 A1 | 11/2007 | Garneau | |
| 2009/0261633 A1 | 10/2009 | Schmid | |
| 2010/0032996 A1* | 2/2010 | Lee | 297/195.1 |

FOREIGN PATENT DOCUMENTS

| | | |
|---|---|---|
| DE | 7521827 U | 2/1976 |
| DE | 69729574 T2 | 6/2005 |
| EP | 0353201 A2 | 1/1990 |
| FR | 2694399 A1 | 2/1994 |
| FR | 2811957 A3 | 1/2002 |
| GB | 769327 A | 3/1957 |
| SU | 763506 A | 9/1980 |

(Continued)

OTHER PUBLICATIONS

International Search Report dated Oct. 27, 2010 for PCT application No. PCT/IB2010/053446.

(Continued)

*Primary Examiner* — Timothy J Brindley
(74) *Attorney, Agent, or Firm* — Ohlandt, Greeley, Ruggiero & Perle, L.L.P.

(57) ABSTRACT

A bicycle saddle, in particular a bicycle sports saddle, comprises a saddle shell. On the lower side of the saddle shell reinforcing ribs are provided. The present design and the arrangement of the reinforcing ribs make it possible to realize a light bicycle saddle having a high inherent flexibility.

22 Claims, 2 Drawing Sheets

(56) References Cited

FOREIGN PATENT DOCUMENTS

| | | | |
|---|---|---|---|
| SU | 1633122 | A | 3/1991 |
| WO | 0210088 | A1 | 1/2002 |
| WO | 0210008 | A1 | 2/2002 |
| WO | 2011033398 | A1 | 3/2011 |

OTHER PUBLICATIONS

International Search Report dated Mar. 27, 2001 for PCT application No. PCT/IL00/00371.

* cited by examiner

BICYCLE SADDLE

CROSS REFERENCE TO RELATED APPLICATIONS

The present disclosure claims the priority of German Patent Application no. DE 20 2012 001 583.4 filed on Feb. 16, 2012, the disclosures of which are incorporated herein by reference in its entirety.

BACKGROUND

1. Field of the Disclosure

The disclosure refers to a bicycle saddle, in particular a bicycle sports saddle.

2. Description of the Prior Art

For bicycle saddles, in particular such bicycle saddles as are used in sports, it is a constant requirement that the saddle should be as light as possible, on the one hand, and should have a high inherent flexibility, on the other hand. The inherent flexibility improves the riding comfort. This requirement exists in particular for saddles of racing bicycles and unsprung mountain bikes. However, inherent flexibility is also desirable in other fields of use.

SUMMARY

It is an object of the disclosure to provide a bicycle saddle, in particular a bicycle sports saddle, which has a high inherent flexibility. Further, the weight of the saddle should be low, while having sufficient stability.

The bicycle saddle of the present disclosure has a saddle shell made in particular of plastic material. A seat element, such as a seat cushion, is arranged on the upper side of the saddle. The seat element may be made of cushioning and/or gel material, for example, and may be covered or fixed by a film, in particular a film made of plastic material. A front receiving element for connection with a saddle frame is arranged in the region of the saddle tip of the saddle shell, i.e. the part of the saddle pointing in the traveling direction in the mounted state. Correspondingly, a rear receiving element for the saddle frame is provided at the rear side. In particular, the rear receptacles are not arranged immediately at the lower side of the saddle shell but at a rebate forming the rear edge of the saddle shell. The inherent flexibility is thereby further improved in this region. In order to be able to provide a saddle shell that is as thin as possible, and therefore light and flexible, reinforcing ribs are provided on a lower side of the saddle. If reinforcing ribs are implemented, as provided by the disclosure, sufficient stability can be achieved if a very thin saddle shell is provided. At the same time, it is possible to achieve a high inherent flexibility of the saddle shell.

Due to the present implementation of reinforcing ribs, it becomes possible to design a flat saddle shell, seen in side elevational view. Not only does this cause weight reduction, but also creates a sporty overall impression.

Preferably, the reinforcing ribs are arranged such that they substantially extend in the direction of force induction of the saddle shell. Force induction into the saddle shell occurs in particular in the region of the front and rear receiving elements via the saddle frame. Further, force induction into the saddle shell also occurs in the region of the sit bones of the cyclist.

Preferably, first reinforcing ribs are provided on the lower side of the saddle, extending from the rear to the front receiving element. The first reinforcing ribs thus extend substantially in the longitudinal direction of the saddle or, in the mounted state of the saddle, in the traveling direction. Preferably, the first reinforcing ribs extend in the edge region of the saddle shell; in particular, the first reinforcing ribs extend at a substantially constant distance from the outer edge of the saddle shell. For example, the first reinforcing ribs extend from the rear side of the saddle to the saddle tip at a distance of 5 mm-10 mm from the outer edge of the saddle shell.

In another preferred embodiment of the present bicycle saddle, the saddle shell has an enlarged seat portion and a narrow front portion. Here, the seat portion forms the rear part of the saddle, seen in the traveling direction, on which a user will sit in particular with his sit bones. The front portion forms the seat tip, where the transition between the seat portion and the front portion being designed as a continuous curved transition. In a preferred embodiment of the present bicycle saddle, second reinforcing ribs are provided. According to the disclosure, in a preferred embodiment, the second reinforcing ribs are at least partly arranged in the transition zone between the seat portion and the front portion. The second reinforcing ribs preferably extend substantially in the longitudinal direction of the saddle. By providing second reinforcing ribs in the transition zone, the stability of the saddle shell can be improved drastically in this zone. Studies have shown that in the saddle shell with high inherent flexibility, improved according to the disclosure, material fatigue will occur first in this zone. These can be reduced substantially by providing the second reinforcing ribs in the transition zone. According to the disclosure, the provision of the second reinforcing ribs is independent of the provision of first reinforcing ribs. Labeling them second reinforcing ribs merely serves to clearly differentiate them the first reinforcing ribs.

Here, it is particularly preferred that the second reinforcing ribs merge with the first reinforcing ribs in the transition zone. As far as the first reinforcing ribs extend substantially parallel to and at a constant distance from the outer edge, the first reinforcing ribs describe an inward oriented curve in the transition zone, only to extend substantially in the longitudinal direction of the saddle in the front portion of the saddle shell. Here, it is preferred that the second reinforcing ribs join the first reinforcing ribs in the region of the inward directed curve of the first reinforcing ribs.

In another preferred embodiment, third reinforcing ribs are provided in addition. The third reinforcing ribs extend from the transition zone between the seat portion and the front portion of the saddle shell into the front portion. Preferably, the third reinforcing ribs merge to form a joint reinforcing rib, the third reinforcing ribs preferably extending inward or in the direction of the saddle centre, starting from the first reinforcing ribs with respect to the saddle width, and then merge in a Y-shape. In the regions where the third reinforcing ribs join, they preferably have a larger width.

In the regions where the first reinforcing rib joins the second and/or third reinforcing rib, respectively, the reinforcing rib is preferably made thicker. Preferably, this thickening extends from the junction with the respective second reinforcing rib to the junction with the respective third reinforcing rib, so that smooth transitions are realized between the reinforcing ribs.

In the regions not thickened, the reinforcing ribs have a width of about 1 mm-3 mm, seen in top plan view. In the region of the thickenings the width may be 4 mm-7 mm.

It is possible to achieve a homogeneous inherent flexibility over the entire length of the saddle, in particular by individual or a combination of the above described arrangements of the reinforcing ribs. Thus, a function of the inherent flexibility along the saddle length shows no or only negligible bounces or steps. It is possible in particular due to the above described preferred embodiments of the reinforcing ribs in the transition zone between the seat portion and the front portion to avoid a rupture of the saddle shell in this highly stressed region, while still achieving a desired flexibility in this region.

As far as the reinforcing ribs have free rib ends, as is preferably the case for the second and the third reinforcing ribs, the same smoothly pass into the lower side of the saddle. Thereby, the occurrence of stress concentrations is avoided.

It is particularly preferred that the reinforcing ribs are arranged such that they follow the direction of the forces induced. In this context, the reinforcing ribs preferably have a branched structure.

For a further improvement of the inherent flexibility of the saddle, in particular of the saddle shell, it is particularly preferred that the rear receiving element is connected with a rear side of the shell. The rear receiving element for receiving the saddle frame is thus preferably not arranged on the lower side of the saddle but at the rear side of the shell. For this purpose it is preferred that the rear side of the shell has a downward directed reinforcing edge. The rear receiving element is preferably connected with the reinforcing edge or is connected with the saddle shell in the region of the reinforcing edge. Here, it is particularly preferred that the rear receiving element has two receptacles connected, with a mutual distance between them, with the lower side of the shell in the region of the reinforcing edge. Preferably, the first reinforcing ribs each start from the two receptacles, since a considerable induction of forces occurs in that region. Here, in a preferred embodiment, the rear receiving elements extend obliquely forward so that the saddle frame is coaxial in the region of the receiving elements.

In another preferred embodiment, bulges are formed at the lower side of the shell in the region of the sit bone support. Thereby, the induction of forces into the saddle shell via the sit bones is improved. Further, it becomes possible thereby to form an enhanced cushioning in this particularly pressure sensitive region, for example by providing gel pads. The bulges preferably are shaped elliptically in the longitudinal direction of the saddle. It is particularly preferred that the second reinforcing ribs are connected with the bulges or merge with the same.

By providing such bulges, it is possible to give the saddle a particularly flat design, seen in side elevational view. On the one hand, a flat saddle shell can be formed due to the reinforcing ribs being provided. In order to realize a flat design or a flat appearance in side elevational view, however, it is necessary to provide a cushion layer that is as thin as possible. By providing the bulges in the region of the sit bone support, comfort is still achieved despite very thin cushioning. Here, the cushioning preferably has a thickness of less than 5 mm, in particular less than 3 mm, and is correspondingly thicker only in the region of the bulges. In the region of the bulges the cushioning may have a thickness of more than 8 mm, in particular more than 10 mm. A trim or flat appearance of the saddle in side elevational view is further realized by the fact that the rear portion of the bicycle saddle, where the cyclist sits on the saddle, is of a flat design. The curvature of the saddle transverse to the longitudinal direction is as slight as possible. This, too, becomes possible by providing reinforcing ribs in the manner provided by the disclosure, since conventional saddles require a curvature to be able to appropriately absorb the forces occurring. In a particularly preferred embodiment, the saddle is horizontal at least between the bulges and deviates from the horizontal by 1 to 2 mm, if at all. Providing bulges is particularly preferred in connection with the second reinforcing ribs. In a still more preferred embodiment, the above described first and/or third reinforcing ribs can be provided and be formed according to the above description.

In a particularly preferred embodiment, the saddle shell including the reinforcing ribs and, if provided, including the bulges, is integrally formed in particular of plastic material Here, the production of the saddle shells can be realized preferably with a plastic injection molding process.

BRIEF DESCRIPTION OF THE DRAWINGS

A full and enabling disclosure of the present disclosure including the best mode thereof, enabling one of ordinary skill in the art to carry out the disclosure, is set forth in greater detail in the following description, including reference to the accompanying drawing in which.

DETAILED DESCRIPTION OF PREFERRED EMBODIMENTS

Figure 1:
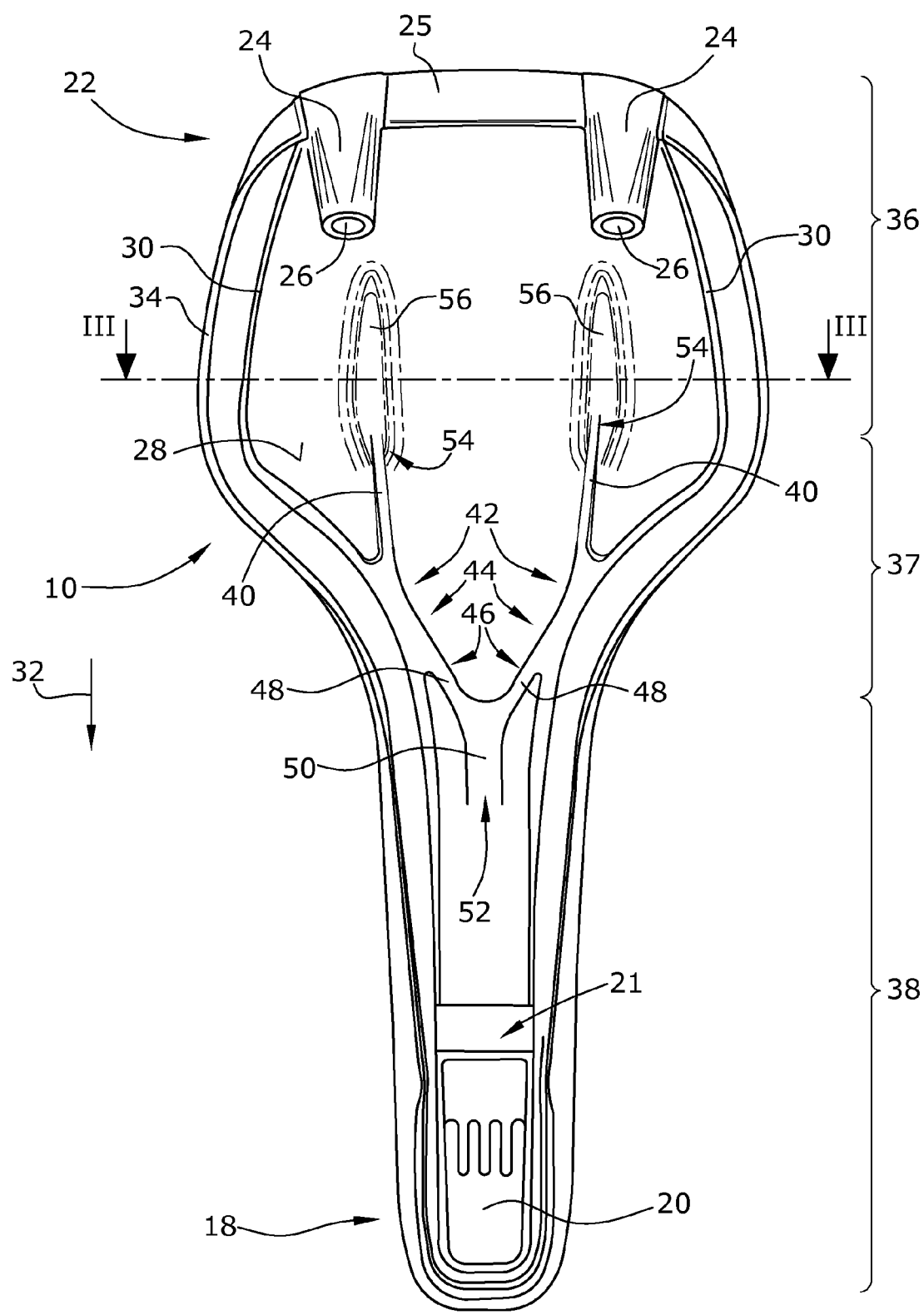
FIG. 1 is a schematic bottom view of the saddle.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the disclosure to the particular form disclosed, but are merely illustrative and intended to teach one of ordinary skill how to make and/or use the disclosure claimed herein.

Figure 2:
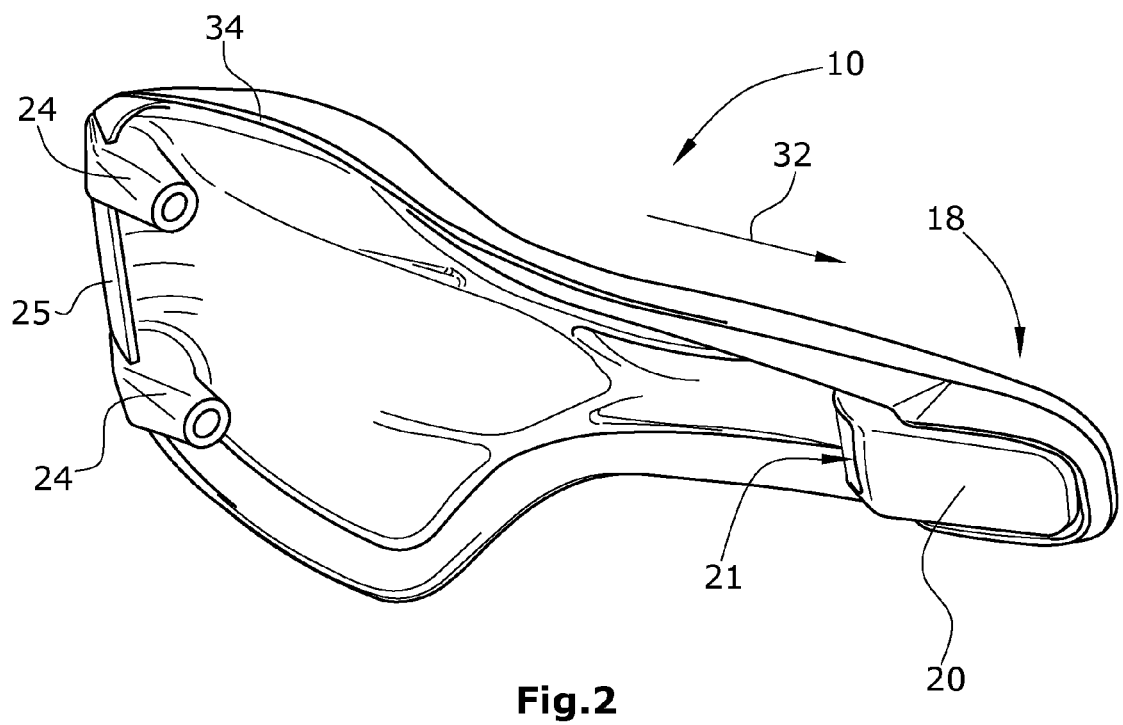
FIG. 2 is a schematic perspective view of the saddle.

The bicycle saddle of the present disclosure, which in particular is a bicycle sports saddle of low weight and high inherent flexibility, comprises a saddle shell 10. On a top side 12 of the shell (FIG. 3), a saddle cushioning 14 is arranged that may also include gel pads, for instance. A film or another thin layer 16 is stretched over the saddle cushioning 14 and is thereby fixed on the saddle shell 10. In the region of a saddle tip 18 (FIGS. 1 and 2), a front receiving element 20 is provided for the connection of the saddle with a saddle frame not illustrated herein. Here, the receiving element 20 can be designed such that the two braces of the saddle frame are inserted into the receiving element 20 from the rear side 21. Further, the receiving element 20 can be designed as a shock absorber so as to further enhance comfort.

Likewise, a rear receiving element is provided in the region of the rear side 22 of the saddle, which element has two receptacles 24 in the embodiment illustrated. These are connected with a downward directed reinforcing edge 25 connected with the saddle shell 10 and may themselves be connected with the saddle frame. The saddle frame is a tubular frame, for instance, whose tube ends are inserted into openings 26 in the receptacles 24. In top plan view, the two tubular elements of the saddle frame are S-shaped so that, similar to the saddle shape, they extend inward from the receptacles 24 and join in the region of the saddle tip to be thereafter connected with the saddle shell 10 at the front receiving element.

Thus, in the embodiment illustrated, force induction into the saddle shell 10 occurs essentially via the rear receptacles 24, as well as the front receiving element 20.

According to the disclosure, the saddle shell 10 has a plurality of reinforcing ribs at the lower side 28 of the saddle. First reinforcing ribs 30 extend in the longitudinal direction 32 of the saddle. In particular, the first reinforcing ribs 30 respectively start from the receptacles 24 and extend to the front receiving element 20. The first reinforcing ribs 30 preferably extend essentially parallel to the outer edge 34 of the shell. The distance of the first reinforcing ribs 30 is substantially constant with respect to the outer edge 34 of the shell.

The saddle shell 10, as well as the entire saddle, comprises a seat portion 36 that receives the essential part of the user's weight. The seat portion 36 passes into a front portion 38 which eventually forms the saddle tip 18. The transition zone 37 between the seat portion 36 and the front portion 38 is of a curved design. The first reinforcing elements 30 extending parallel to the outer edge 34 of the saddle shell are correspondingly formed with an inward curve in the transition zone 37.

In the illustrated preferred embodiment of the present saddle, second reinforcing ribs 40 are provided in addition. These are arranged in that edge zone of the seat portion 36 to which the front portion 38 is directed. Since these two zones are zones that cannot be clearly separated and merge seamlessly, the second reinforcing ribs 40 may also be arranged such that they are located in the transition zone 37 between the seat portion 36 and the front portion 38. The second reinforcing ribs 40 extend substantially in the longitudinal direction 32. The second reinforcing ribs 40 arranged in the transition zone 37 between the seat portion 36 and the front portion 38, pass into the first reinforcing ribs 30. Thus a portion 42 between the first and the second reinforcing ribs 30, 40 is formed Y-shaped like a fork. In this portion, the first reinforcing ribs 30 have a thickening 44. A further branch 46 is formed in the direction of the saddle tip 18. Thereby, the thickening 44 passes into third reinforcing ribs 48. The third reinforcing ribs 48 that extend inward are then merged in a Y-shape so that a portion 50 of about twice the width is formed by the third reinforcing rib 48.

Free ends 52, 54 of the reinforcing ribs 40, 50 preferably pass smoothly into the lower side 29 of the saddle.

Figure 3:
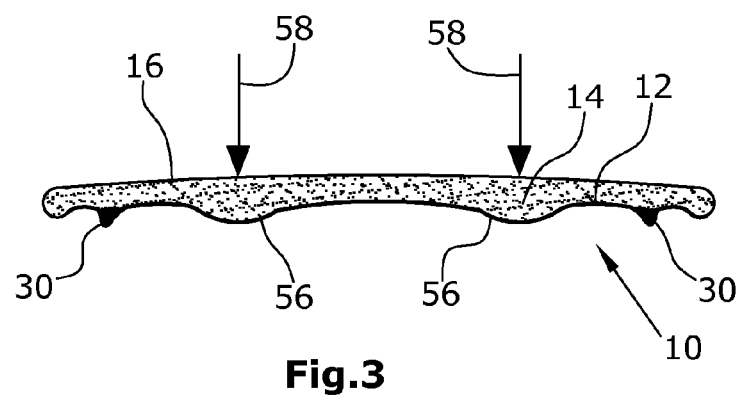
FIG. 3 is a schematic sectional view along the line III-III in FIG. 1.

Another particular feature is represented by the end portions 54 of the second reinforcing ribs 40, since the same pass into downward formed bulges 56 (FIG. 3) of the saddle shell 10. These bulges 56 are arranged in the region of the sit bones of a user. The sit bones press on the seat cushioning as illustrated in FIG. 3 by the arrows 58. It is possible by means of the bulges 56 to achieve a flowing smooth force induction into the saddle shell, given a high inherent flexibility of the saddle shell 10. It should be considered in this context that, however, a large part of the forces induced is induced via the rear receptacles 24 and the front receiving element 20.

Although the disclosure has been described and illustrated with reference to specific illustrative embodiments thereof, it is not intended that the disclosure be limited to those illustrative embodiments. Those skilled in the art will recognize that variations and modifications can be made without departing from the true scope of the disclosure as defined by the claims that follow. It is therefore intended to include within the disclosure all such variations and modifications as fall within the scope of the appended claims and equivalents thereof.

What is claimed is:

1. A bicycle saddle, comprising:
   a saddle shell,
   a seat element arranged on a top side of the saddle shell,
   a front receiving element for connection with a saddle frame, the front receiving element being provided in a region of a saddle tip at the saddle shell,
   a rear receiving element for connection with the saddle frame, the rear receiving element being provided at a rear edge of the saddle shell, and
   reinforcing ribs provided on a lower side of the saddle shell, wherein the saddle shell has an enlarged seat portion and a narrow front portion, and wherein the reinforcing ribs comprise first reinforcing ribs that extend from the rear receiving element to the front receiving element and third reinforcing ribs that extend from a transition zone between the enlarged seat portion and the narrow front portion into the narrow front portion, the third reinforcing ribs merging with the first reinforcing ribs.

2. The bicycle saddle of claim 1, wherein the reinforcing ribs extend substantially in a direction of force induction into the saddle shell.

3. The bicycle saddle of claim 1, wherein the first reinforcing ribs extend at a substantially constant distance from an outer edge of saddle shell.

4. The bicycle saddle of claim 1, wherein the rear receiving element comprises two receptacles, a respective reinforcing rib extending from each receptacle to the first receiving element.

5. The bicycle saddle of claim 1, further comprising second reinforcing ribs that are arranged at least in part in the transition zone between the enlarged seat portion and the narrow front portion.

6. The bicycle saddle of claim 5, wherein the second reinforcing ribs merge with the first reinforcing ribs in the transition zone.

7. The bicycle saddle of claim 1, wherein the third reinforcing ribs comprise two third reinforcing ribs that merge into a combined reinforcing rib located in a center with respect to a width of the saddle shell.

8. The bicycle saddle of claim 1, wherein the first reinforcing ribs comprises a thickening in a region of junction with the second reinforcing ribs and/or the third reinforcing ribs.

9. The bicycle saddle of claim 8, wherein the thickening extends from the region of junction with the second reinforcing ribs to the junction with the respective third reinforcing rib.

10. The bicycle saddle of claim 1, wherein free rib ends pass smoothly into the lower side of the saddle shell.

11. The bicycle saddle of claim 5, further comprising bulges provided on the lower side of the saddle shell in a region of a sit bone support.

12. The bicycle saddle of claim 11, wherein the second reinforcing ribs pass into the bulges.

13. The bicycle saddle of claim 1, further comprising a reinforcing edge provided at the rear edge of the saddle shell.

14. The bicycle saddle of claim 13, wherein the rear receiving element is connected with the reinforcing edge.

15. The bicycle saddle of claim 5, wherein the second reinforcing ribs extend substantially in a longitudinal direction of the saddle shell.

16. The bicycle saddle of claim 13, wherein the reinforcing edge extends downward from the lower side of the saddle shell.

17. A bicycle saddle, comprising:
   a saddle shell having a top side, a lower side, a narrow saddle tip portion, an enlarged seat portion, and a transition zone between, with respect to a longitudinal direction of the saddle shell, the narrow saddle tip portion and the enlarged seat portion,
   a seat element arranged on the top side,
   a front receiving element in a region of the saddle tip portion for connection with a saddle frame,
   a rear receiving element in a region of the enlarged seat portion for connection with the saddle frame,
   a first reinforcing rib provided on each of a left region and a right region of the lower side of the saddle shell, a second reinforcing rib provided on each of the left and right regions of the saddle shell, and a third reinforcing rib provided on each of the left and right regions of the saddle shell, wherein the first, second, and third reinforcing ribs on the left region merge into one another at a left thickening and the first, second, and third reinforcing ribs on the right region merge into one another at a right thickening, and wherein the third reinforcing ribs on the left and right regions merge together into a central portion that extends in the longitudinal direction towards the narrow saddle tip portion.

18. The bicycle saddle of claim 17, wherein the central portion and the second reinforcing ribs on the left and right regions each have a free rib end that passes smoothly into the lower side.

19. The bicycle saddle of claim 17, wherein the central portion, the third reinforcing rib on the left region, and the third reinforcing rib on the right region define a central y-shape.

20. The bicycle saddle of claim 17, wherein the second reinforcing rib on the left region extends in the longitudinal direction from the left thickening towards the enlarged seat portion and the second reinforcing rib on the right region extends in the longitudinal direction from the right thickening towards the enlarged seat portion.

21. The bicycle saddle of claim 20, wherein the first and second reinforcing ribs on the left region define a y-shape depending from the left thickening and the first and second reinforcing ribs on the right region define a y-shape depending from the right thickening.

22. The bicycle saddle of claim 17, wherein the first reinforcing rib on the left region extends from the left thickening so as to pass from the rear receiving element to the front receiving element and the first reinforcing rib on the right region extends from the right thickening so as to pass from the rear receiving element to the front receiving element.

* * * * *